Aug. 11, 1970 J. C. LOGUE 3,523,706

APPARATUS FOR SUPPORTING ARTICLES WITHOUT STRUCTURAL CONTACT AND FOR POSITIONING THE SUPPORTED ARTICLES

Filed Oct. 27, 1967

INVENTOR
JOSEPH C. LOGUE

BY J. B. Kraft
ATTORNEY

United States Patent Office 3,523,706
Patented Aug. 11, 1970

3,523,706

APPARATUS FOR SUPPORTING ARTICLES WITHOUT STRUCTURAL CONTACT AND FOR POSITIONING THE SUPPORTED ARTICLES

Joseph C. Logue, Poughkeepsie, N.Y., assignor to International Business Machines Corporation, Armonk, N.Y., a corporation of New York Filed Oct. 27, 1967, Ser. No. 678,704
Int. Cl. B66c 1/02
U.S. Cl. 294—64 7 Claims

ABSTRACT OF THE DISCLOSURE

Apparatus for supporting wafer-like articles without structurally contacting the articles. A plate is positioned in proximate spaced relationship with a surface of the article. A flow of air under positive pressure parallel to the plate is introduced into the space between the surface and the plate. The article is held suspended and spaced from the plate by the Bernoulli effect due to the reduced air pressure in the space resulting from the increased velocity of the air in said space. Projections from the plate limit lateral movement of the supported article.

BACKGROUND OF THE INVENTION

Field of invention

The present invention relates to apparatus for handling articles by fluid dynamics. More particularly it relates to apparatus for supporting and for positioning the articles.

Description of the prior art

The handling of small fragile articles such as semiconductor wafers has presented a problem. Because of their fragility and their susceptibility to marring, manual handling has been less than satisfactory. When handled by instruments such as tweezers, the marring and breakage problems remain substantially undiminished. Presently, vacuum probes are being used in the art to pick up and move wafers during processing of the wafers. Such vacuum probes must contact at least one surface of the wafer. Since the processing of an article such as a wafer may require numerous pickups to move the wafer from one processing position to another, there remains a risk of breakage of the wafer or damage to the contacted wafer surface by the probe.

SUMMARY OF THE INVENTION

The present invention provides apparatus for pickup and the movement of articles such as wafers without physically contacting the articles. The apparatus comprises a plate which is operationally maintained in proximate spaced relationship with a surface of the wafer and means for introducing into the space between the wafer surface and the plate a flow of air or other fluid under positive pressure parallel to the plate.

The flow of air above the surface of the wafer relative to the substantially stable condition of the air below the wafer results in a Bernoulli effect. The relatively reduced pressure above the wafer in the space between the wafer and the plate causes the wafer to be drawn toward the plate to a position where the wafer is suspended in spaced relationship to the plate. The retained wafer may then be moved by moving the apparatus from one position to another. To release the wafer, the air flow is terminated.

It has been found that probably due to stray air currents, irregular movement of the apparatus or other causes, the suspended wafer displays a tendency to move laterally. If this lateral movement is not limited, it will cause a disruption of the parallel air flow within the space between the wafer and plate resulting in the premature release of the wafer. The apparatus of the present invention further includes retaining means associated with the plate for limiting the lateral movement of suspended wafers. Such retaining means project from the plate to laterally enclose the wafer and have openings to permit the unimpeded passage of the air flow.

The air flow is preferably introduced into the space between the plate and wafer through one or more apertures in the plate.

In accordance with another aspect of the present invention, advantage is taken of the facility with which the suspended wafer may be moved laterally and rotated. Utilizing a circular wafer having a peripheral notch and a plate having a projection which is registrable with said notch, air or other suitable fluid is applied through an aperture in the plate against the surface of the wafer to move the wafer laterally or translationally toward the projection. Similarly, air is applied through an aperture in the plate against the surface of the wafer to rotate the wafer. Therefore, as a result of the applied forces, the suspended wafer moves laterally until it engages the projection and then continues to rotate until the notch registers with the projection to fix the orientation of the wafer. This provides apparatus for translationally and rotationally positioning the wafer while the same is suspended on the supporting apparatus.

Accordingly, it is a primary object of the present invention to provide apparatus for supporting and conveying articles without physically contacting the supported articles.

It is another object to provide apparatus for supporting and conveying articles without physical contact having means for preventing the premature release of the supported article.

It is a further object to provide apparatus for supporting and conveying articles without physical contact having means for translationally and rotationally orienting the conveyed articles.

The foregoing and other objects, features, and advantages of the invention will be apparent from the following more particular description of a preferred embodiment of the invention as illustrated in the accompanying drawings:

DESCRIPTION OF THE PREFERRED EMBODIMENTS

Figures 1A, 2A:
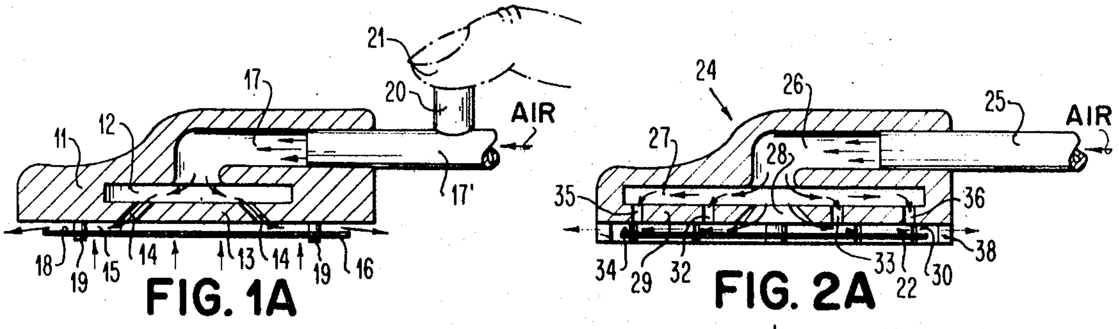
FIG. 1A is a partial sectional view taken along line 1A—1A of FIG. 1.
FIG. 2A is a sectional view taken along line 2A—2A of FIG. 1.
Figure 1:
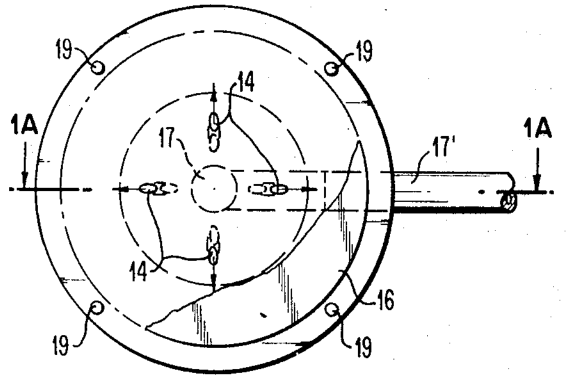
FIG. 1 is a diagrammatic plan view of a preferred embodiment of the apparatus of this invention.

Referring to FIGS. 1 and 1A, wafer carrier 10 comprises housing 11 enclosing central manifold 12. Base plate 13 has formed therein apertures 14 communicating with manifold 12 and symmetrically disposed with respect to the center of base plate 13. A source of the air under positive pressure is applied to manifold 12 through conduit 17. The air is then forced from manifold 12 through apertures 14 into space 15 between base plate 13 and wafer 16. This creates a stream or flow of air flowing parallel to the base plate and radially from the central portion of the plate towards the periphery of the plate and the wafer. Because the air above wafer 16 has a steady flow while the air below the wafer is relatively static, a Bernoulli effect is created wherein an area of reduced pressure is formed within space 15. The normal or ambient air pressure below the wafer acts to push wafer 16 against this reduced pressure towards plate 13. The flow of air within space 15 acts to prevent wafer 16 from contacting plate 13, and wafer 16 is thus retained by the carrier in suspended spacial relationship with respect to base plate 13. By connecting suitable handle means to tube 17', the wafer may be transferred from one location to another by manually moving the carrier.

It has been found that during wafer pickup and movement, surface 18 of wafer 16 is subjected to stray air currents which tend to push the wafer laterally. In addition, jarring and abrupt movement during conveying of the carrier may impart lateral motion to the wafer. If not limited, such lateral motion will cause the wafer to reach a position where the air flow within space 15 is disrupted. This will cause a premature release of wafer 16. In order to limit such lateral movement, projections 19 extend from plate 13 to laterally enclose the wafer. A wafer moving laterally in any direction will shortly be stopped by one or more of projections 19. Where the wafer to be picked up is initially lying on a flat surface, projections 19 serve the additional purpose of acting as standoffs to prevent plate 13 from contacting wafer surface 18 when carrier 10 is brought into engagement with the wafer.

When the wafer is to be released from the carrier, the air feed may be terminated. More conveniently, when the carrier is handled manually, a constant feed of air may be applied to tube 17', and the flow of air into conduit 17 is controlled by means of vent 20. When air is to be applied to the carrier, the operator closes vent 20 with his finger 21 as shown in FIG. 1. When air flow is to be terminated so that the wafer may be released, the operator's finger is removed from vent 20 permitting the air to be vented rather than being fed to conduit 17.

Figure 2:
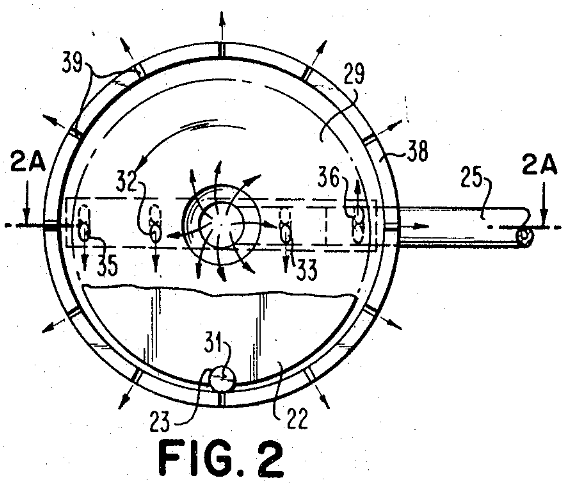
FIG. 2 is a diagrammatic plan view of another embodiment of the present invention.

In accordance with another embodiment of the present invention, lateral and rotational motion is imparted by aerodynamic means to the wafer suspended in the carrier to move the wafer into a preselected rotational and translational orientation. Referring to FIGS. 2 and 2A, wafer 22 having peripheral notch 23 formed therein is suspended on carrier 24 in the manner described with respect to the embodiment of FIG. 1. A source of air under positive pressure is applied through tube 25 and conduit 26 to manifold 27. Air leaving manifold 27 through central aperture 28 in base plate 29 provides the air flow in intermediate space 30 parallel to the base plate 29 which creates the area of reduced pressure in space 30 necessary to retain wafer 22 in suspended spaced relationship in respect to plate 29. Orienting stud 31 projects from base plate 29. Peripheral notch 23 in wafer 22 is registrable with stud 31, and when the notch is so registered, the wafer is in the preselected rotational and translational orientation. In order to move notch 23 into registration with stud 31, apertures 32 and 33 are formed in base plate 29 at such an angle that air forced from manifold 27 through these apertures impinges against surface 34 of wafer 22 to impart to said wafer a lateral motion toward stud 31. In a similar manner, air forced from manifold 27 through apertures 35 and 36 in base plate 29 impinges against wafer surface 34 in the direction shown in FIG. 2 to impart a resultant rotational motion to wafer 22. Therefore, wafer 22 while suspended is moved laterally until its periphery contacts stud 31. The wafer continues to rotate while in contact with stud 31 until notch 23 registers with stud 31. The wafer is then retained on the carrier in the preselected translational and rotational orientation. The oriented wafer may then be released in the manner described with respect to the embodiment of FIG. 1.

Retaining wall 38 projecting from base plate 29 laterally encloses wafer 22 and acts to limit any of the previously described stray or random lateral movements of wafer 22. Apertures 39 formed in wall 38 permit unimpeded air flow passage through the retaining wall.

Figure 3A:
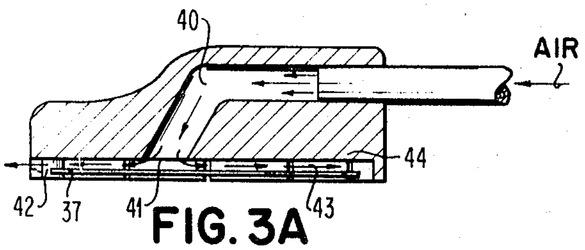
FIG. 3A is a sectional view taken along line 3A—3A of FIG. 3.
Figure 3:
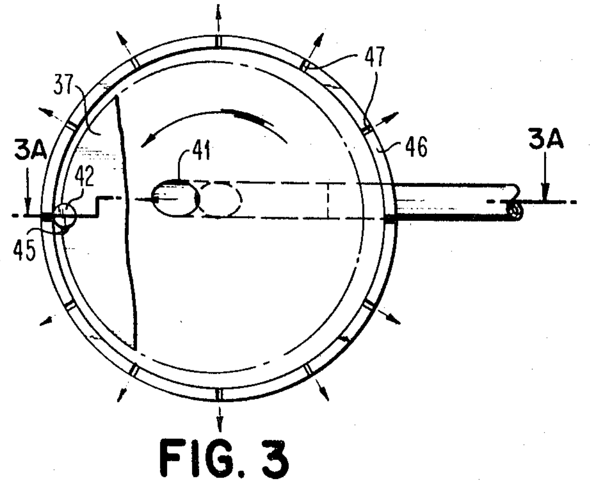
FIG. 3 is a diagrammatic plan view of still another embodiment of the apparatus of the present invention.

While the embodiment of FIG. 2 discloses a structure in which the parallel or suspending air flow, the air stream for translationally moving the wafer, and the air streams for rotationally moving the wafer are applied through individual apertures, it is possible to provide a structure in which the three motions are imparted to the wafer by means of air emitted from a single aperture. The embodiment shown in FIGS. 3 and 3A discloses such a structure. By utilizing in the carrier a conduit 40 emitting air at an angle sufficient to impart to the surface of wafer 37 a translational movement towards stud 42 and which has an opening 41 off-center with respect to the plate so that the emitted air imparts a rotational movement to the wafer, all three functions are performed since a substantial portion of air leaving aperture 41 still forms an air flow within space 43 between the wafer and base plate 44 to provide the area of reduced pressure necessary to suspend the wafer.

In the manner previously described, the suspended wafer will be moved translationally into contact with stud 42 while continuing to rotate until notch 45 registers with the stud to orient the wafer. Retaining wall 46 having apertures 47 performs the previously described function of limiting any stray or random lateral movements of wafer 37.

While the specific embodiments have been described utilizing air, it should be clear that the fluid dynamic principles involved in the present invention would apply irrespective of the nature of the fluid used. Both gases and liquid may be utilized. However, it is preferable that the fluid which is applied under positive pressure be in the same state as the ambient or the medium through which the wafer is to be carried.

While the invention has been particularly shown and described with reference to preferred embodiments thereof, it will be understood by those skilled in the art that various changes in form and detail may be made therein without departing from the spirit and scope of the invention.

What is claimed is:

1. Apparatus for positioning and supporting a circular wafer having a peripheral notch in a preselected rotational and translational orientation without physically contacting a surface of said wafer comprising a flat plate in proximate, spaced relationship with a surface of said wafer said plate having formed therein at least one aperture a source of fluid under positive pressure in the same state as the ambient connected to said at least one aperture for introducing through said aperture into the space between the wafer and the plate a flow of said fluid parallel to the plate to suspend said wafer in spaced relationship to said plate a projection from said plate adapted to be registrable with said wafer notch means for applying fluid through said at least one aperture gainst the surface of the wafer to move the wafer translationally toward said projection, and means for applying fluid through said at least one aperture against the surface of said wafer to rotate said wafer, whereby the wafer engages the projection and rotates until the notch registers with the projection to fix the orientation of the wafer.

2. The apparatus of claim 1 wherein said fluid is gas.

3. The apparatus of claim 2 wherein said plate has one aperture formed therein.

4. The apparatus of claim 2 wherein said source of gas and both of said means for applying gas are connected to the same aperture.

5. The apparatus of claim 2 wherein said source of gas and both of said means for applying gas are connected to individual apertures.

6. The apparatus of claim 2 further including retaining means extending from the plate to laterally enclose the supported article, said retaining means having openings to permit the passage of gas therethrough.

7. The apparatus of claim 6 wherein said projection is positioned intermediate the wafer periphery and the retaining means.

References Cited

UNITED STATES PATENTS

| | | | |
|---|---|---|---|
| 3,425,736 | 2/1969 | Benjamin | 294—64 |
| 3,438,668 | 4/1969 | Olsson | 294—64 |

| | | | |
|---|---|---|---|
| 3,158,367 | 11/1964 | Tarbuck. | |
| 3,168,307 | 2/1965 | Walton et al. | 271—26 |
| 3,223,443 | 12/1965 | Misson. | |
| 3,345,922 | 10/1967 | Williams | 271—26 |

FOREIGN PATENTS

| | | |
|---|---|---|
| 944,175 | 12/1963 | Great Britain. |

ANDRES H. NIELSEN, Primary Examiner